US008873570B2

(12) United States Patent
P et al.

(10) Patent No.: US 8,873,570 B2
(45) Date of Patent: Oct. 28, 2014

(54) EXTENSIBLE SYSTEM AND METHOD TO BRIDGE SIP AND UPNP DEVICES

(75) Inventors: Sethuramalingam P, Bangalore (IN); Glen P. Goffin, Dublin, PA (US); Suresh Kumar Chintada, Bangalore (IN)

(73) Assignee: Motorola Mobility LLC, Libertyville, IL (US)

( * ) Notice: Subject to any disclaimer, the term of this patent is extended or adjusted under 35 U.S.C. 154(b) by 578 days.

(21) Appl. No.: 11/969,648

(22) Filed: Jan. 4, 2008

(65) Prior Publication Data

US 2009/0175296 A1 Jul. 9, 2009

(51) Int. Cl.
*H04L 12/20* (2006.01)
*H04L 29/06* (2006.01)
*H04L 29/08* (2006.01)
*H04L 12/28* (2006.01)

(52) U.S. Cl.
CPC ........ *H04L 65/102* (2013.01); *H04L 29/06285* (2013.01); *H04L 12/2809* (2013.01); *H04L 12/282* (2013.01); *H04L 12/2832* (2013.01); *H04L 29/08846* (2013.01); *H04L 67/16* (2013.01); *H04L 67/28* (2013.01)
USPC ...................................................... 370/401

(58) Field of Classification Search
CPC .................. H04L 29/06197; H04L 29/06027; H04L 29/0685; H04L 29/06285
USPC ...................................................... 370/401
See application file for complete search history.

(56) References Cited

U.S. PATENT DOCUMENTS

| | | | |
|---|---|---|---|
| 7,583,685 B2 * | 9/2009 | Ajitomi et al. ................ | 370/401 |
| 7,761,571 B2 * | 7/2010 | Bushmitch et al. ........... | 709/226 |
| 2002/0103898 A1 * | 8/2002 | Moyer et al. .................. | 709/224 |
| 2005/0114491 A1 | 5/2005 | Bushmitch et al. | |
| 2006/0140199 A1 * | 6/2006 | Ma et al. ....................... | 370/401 |
| 2006/0153072 A1 * | 7/2006 | Bushmitch et al. ........... | 370/230 |
| 2007/0198669 A1 * | 8/2007 | Convertino et al. .......... | 709/220 |
| 2009/0092109 A1 * | 4/2009 | Cagenius et al. ............. | 370/338 |
| 2010/0198954 A1 * | 8/2010 | Grasso et al. ................. | 709/223 |
| 2010/0293299 A1 * | 11/2010 | Stokking et al. .............. | 709/249 |

OTHER PUBLICATIONS

Request for Comment 3261 (Jun. 2002).*
Anand, S. Vijay. A DLNA Framework for Next Gen Mobile Terminals Connecting IMS Networks for Human-Centered Digital Home Environment, 2007 International Conference on IP Multimedia Subsystem Architecture and Applications. Dec. 6-8, 2007: pp. 1-5.*

(Continued)

*Primary Examiner* — Benjamin Lamont
(74) *Attorney, Agent, or Firm* — Leydig, Voit & Mayer, Ltd.

(57) ABSTRACT

Embodiments of the invention generally provide a method and apparatus for bridging session initiation protocol and universal plug and play devices. One embodiment of the invention specifies a method that enables legacy session initiation protocol and universal plug and play devices to communicate with each other (i.e., to access services), where the term "legacy" is defined to mean IETF RFC 3261-compliant for session initiation protocol devices, and DLNA 1.0-compliant for universal plug and play devices. The method enables inter-working between the session initiation protocol and universal plug and play devices without requiring changes to the legacy devices. One embodiment of the invention is a transparent software bridge that enables these features.

20 Claims, 4 Drawing Sheets

(56) References Cited

OTHER PUBLICATIONS

Bushmitch, D. et al., A SIP-based Device Communication Service for OSGi Framework, IEEE Consumer Communications and Networking Conference, p. 453-458 (Jan. 5-8, 2004).*

PCT Search Report & Written Opinion, RE: Application #PCT/US2008/087926 Jul. 13, 2009.

Guiran Chang, et al: "Implementing a SIP-based Device Communication Middleware for OSGi Framework with Extension to Wireless Networks" pp. 1-8, Jun. 20, 2006.

Suresh Chintada, et al: "Converged Services for Home Using a SIP/UPnP Software Bridge Solution" pp. 790-794, Jan. 12, 2008.

Pavlin Dobrev, et al: "Device and Service Discovery in Home Networks with OSGi" pp. 86-92, Aug. 1, 2002.

Cheng, Jacqui and Ecker, Clint. "Apple TV: an in-depth review" ARS Technica, published Mar. 27, 2007. http://arstechnica.com/reviews/hardware/appletv.ars.

DLNA (Digital Living Network Alliance), "Home Networked Device Interoperability Guidelines (V 1.0)", 2004.

DLNA (Digital Living Network Alliance), "Home Networked Device Interoperability Guidelines (V1.0) Addendum: Optional Media Format Guidelines v1.0", 2004.

S. Moyer et al., "Framework Draft for Networked Appliances using the Session Initiation Protocol," Internet Engineering Task Force (Jun. 2001), available at http://www.argreenhouse.com/iapp/draft-moyer-sip-appliances-framework-02.pdf.

* cited by examiner

EXTENSIBLE SYSTEM AND METHOD TO BRIDGE SIP AND UPNP DEVICES

FIELD OF THE INVENTION

The present invention generally relates to home and mobile networking applications, and more particularly relates to Session Initiation Protocol and Universal Plug and Play technologies.

BACKGROUND OF THE INVENTION

Session Initiation Protocol (SIP) and Universal Plug and Play (UPnP) are two protocols that are widely deployed in home and mobile networking applications. While UPnP is traditionally popular in the home consumer space, SIP tends to be popular in both home and mobile environments. Although attempts have been made to bridge the SIP and UPnP technologies, such attempts have been limited by the capabilities of the devices.

Figure 1:
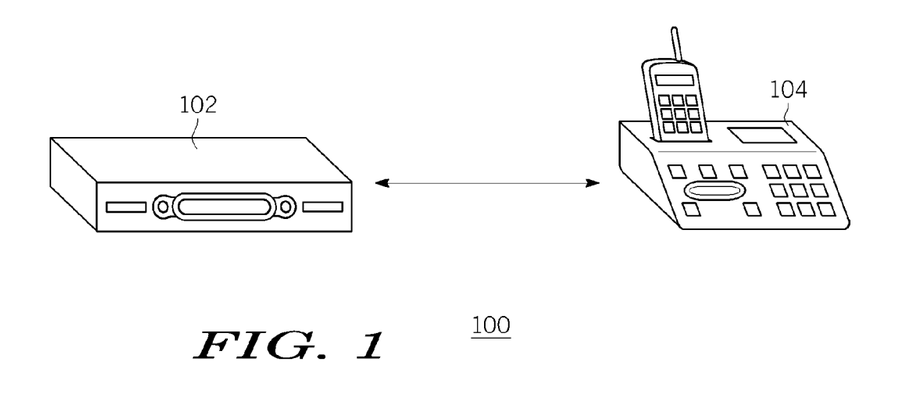
FIG. 1 is a schematic diagram illustrating a system in which an exemplary UPnP device and an exemplary SIP device are attempting to communicate.

FIG. 1, for example, is a schematic diagram illustrating a system 100 in which an exemplary UPnP device 102 (e.g., an audio/visual server) and an exemplary SIP device 104 (e.g., a cordless phone) are attempting to communicate. One approach in which the SIP device 104 and the UPnP device 102 may be bridged is via a home gateway that requires SIP extensions (e.g., Session Initiation Protocol for Instant Messaging and Presence Leveraging Extensions, or SIMPLE) on the SIP device 104. A second approach requires either a UPnP stack on the SIP device 104, or a SIP stack on the UPnP device 102. Thus, existing solutions are limited to situations in which the end device(s) have a required capability even to enable minimal interoperability. In other words, these solutions are not extensible to legacy devices that may already be deployed in a user's network. A legacy SIP device is a single-mode device that only supports the Internet Engineering Task Force (IETF) Request for Comments (RFC) 3261 SIP features. A legacy UPnP device is a single-mode device that only supports UPnP capabilities as specified by Digital Living Network Alliance (DLNA) 1.0 guidelines.

Moreover, existing approaches to bridging the SIP and UPnP technologies typically do not support bidirectional internetworking. That is, while the approaches enable an SIP device (with extensions) to access UPnP services, no attempts have been made to make a service offered by a user communication device (e.g., an SIP device) accessible to a UPnP network.

Therefore, there is a need in the art for a method and apparatus for bridging Session Initiation Protocol and Universal Plug and Play devices.

BRIEF DESCRIPTION OF THE DRAWINGS

So that the manner in which the above recited embodiments of the invention are attained and can be understood in detail, a more particular description of the invention may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Figure 2:
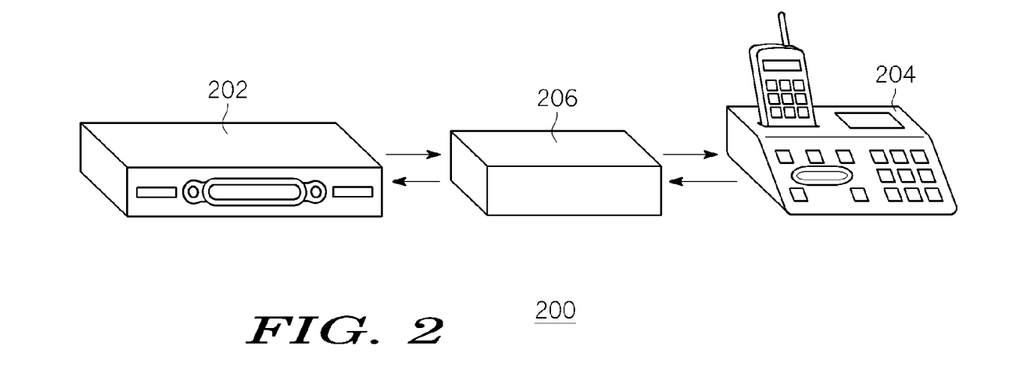
FIG. 2 is a schematic diagram illustrating one embodiment of a system for bridging Session Initiation Protocol and Universal Plug and Play devices

FIG. 2 is a schematic diagram illustrating one embodiment of a system 200 for bridging Session Initiation Protocol and Universal Plug and Play devices. In the illustrated embodiment, a legacy UPnP device 202 (e.g., an audio/visual server) and a legacy SIP device 204 (e.g., a cordless phone) communicate via a software bridge 206, for example embodied in a personal computer, a residential gateway, a cellular telephone, or in a dedicated, standalone device (e.g., a set top box). The software bridge 206 operates transparently. That is, the software bridge 206 makes the legacy SIP device 204 look transparent to the legacy UPnP device 202, and vice versa, so that the legacy SIP device 204 and the legacy UPnP device 202 operate as they normally would. Once the software bridge 206 is implemented, the legacy SIP device 204 and the legacy UPnP device 202 may communicate directly or communicate using the software bridge 206 as an intermediary.

As described in further detail below, the software bridge 206 relies on overloading the features of RFC 3261 SIP and on common applications. No additional protocol features, changes to the SIP specification or new application features are required for the software bridge 206 to successfully allow the legacy UPnP device 202 and the legacy SIP device 204 to communicate. As also discussed further below, the software bridge 206 enables the legacy UPnP device 202 to access session services by relaying session services offered by the legacy SIP device 204 to the UPnP network, thus facilitating bidirectional internetworking.

Figure 3:
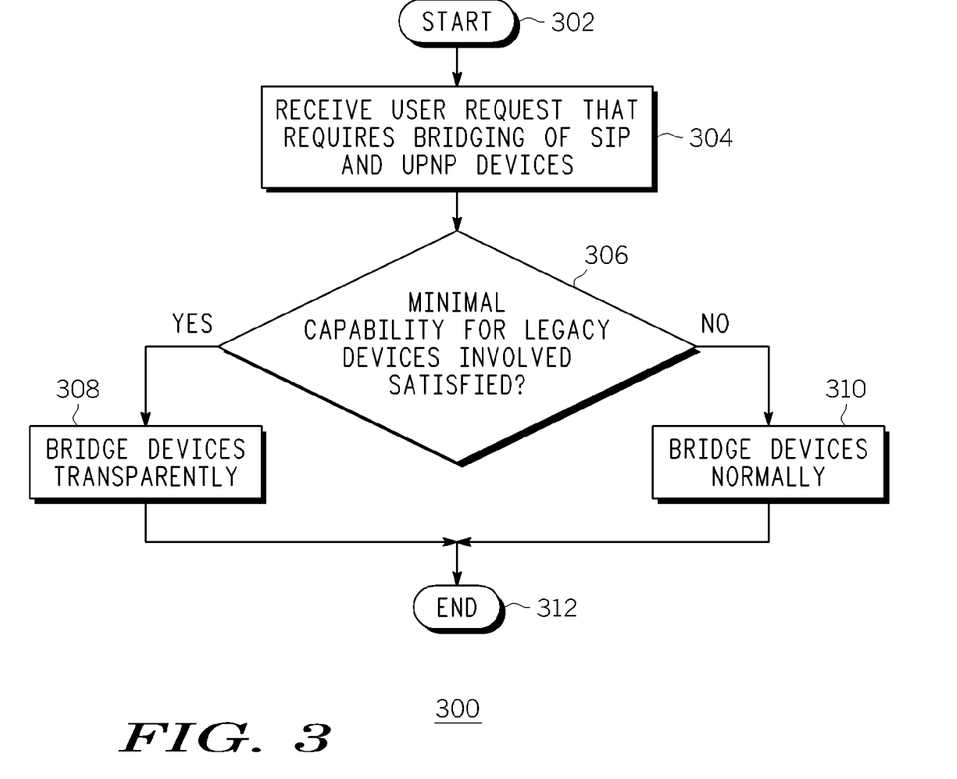
FIG. 3 is a flow diagram illustrating one embodiment of a method for bridging Session Initiation Protocol and Universal Plug and Play devices.

FIG. 3 is a flow diagram illustrating one embodiment of a method 300 for bridging Session Initiation Protocol and Universal Plug and Play devices. The method 300 thus illustrates the functionality of the transparent software bridge 206 illustrated in FIG. 2, and may therefore be implemented, for example, at a residential gateway or at a standalone accessory to an SIP device.

The method 300 is initialized at step 302 and proceeds to step 304, where the software bridge receives a user request that requires the bridging of at least one SIP device and at least one UPnP device. For example, the user may want to stream music from a UPnP-based home media server to an SIP cordless phone.

In step 306, the software bridge determines whether the minimal capability for legacy devices involved in the requested action in the request action is satisfied. As described above, a legacy SIP device is a single-mode device that only supports RFC3261 SIP features, and a legacy UPnP device is a single-mode device that only supports UPnP capabilities as specified by DLNA 1.0 guidelines.

If the software bridge concludes in step 306 that the minimal capability for the legacy devices involved in the requested action is not satisfied, the method 300 proceeds to step 310, and the software bridge bridges the devices normally (e.g., via a home gateway, SIP stack on UPnP device or UPnP stack on SIP device) before terminating in step 312.

Alternatively, if the software bridge concludes in step 306 that the minimal capability for the legacy devices involved in the requested action is satisfied, the method 300 proceeds to step 308, and the software bridge bridges the devices transparently (i.e., substantially without impact to the operation, behavior or configuration of the bridged devices) before the method 300 terminates in step 312.

Figure 4:
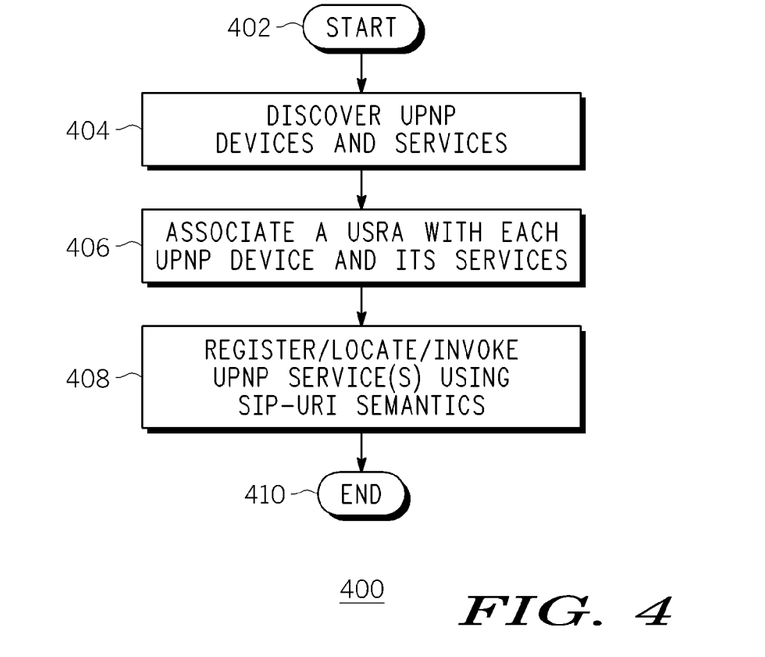
FIG. 4 is a flow diagram illustrating a more detailed embodiment of a method for bridging Session Initiation Protocol and Universal Plug and Play devices.

FIG. 4 is a flow diagram illustrating a more detailed embodiment of a method 400 for bridging Session Initiation Protocol and Universal Plug and Play devices. Like the method 300, the method 400 may be implemented in a software bridge embodied, for example, in a residential gateway or at a standalone accessory to an SIP device. The method 400 is specifically directed to enabling an SIP device to access UPnP services. Thus, for example, the method 400 may be implemented by a user in order to stream music from a UPnP-based home media server to an SIP cordless phone.

The method 400 is initialized at step 402 and proceeds to step 404, where the software bridge discovers UPnP devices and their services. Following discovery, the method 400 proceeds to step 406, and the software bridge associates a User Service Request Address (USRA) with each discovered UPnP device and the UPnP device's services. The USRA is a novel address format that reuses the format of the SIP Uniform Resource Identifier (URI), which enables standard RFC3261 SIP procedures to be used without making changes to the SIP or UPnP devices. However, where the SIP URI is used for addressing users (e.g., the users of services), the USRA is used to address services offered by a bridge. For example, abstract services (e.g., UPnP application handles, such as "StreamMusic") are mapped to executable UPnP actions or sequences of UPnP actions for use by SIP users, by reusing the SIP URI. In one embodiment, the USRA comprises a domain (e.g., the SIP domain "JohnsHome.net"), a device ID (e.g., "JohnPC") and a service ID (e.g., "StreamMusic").

Figure 6:
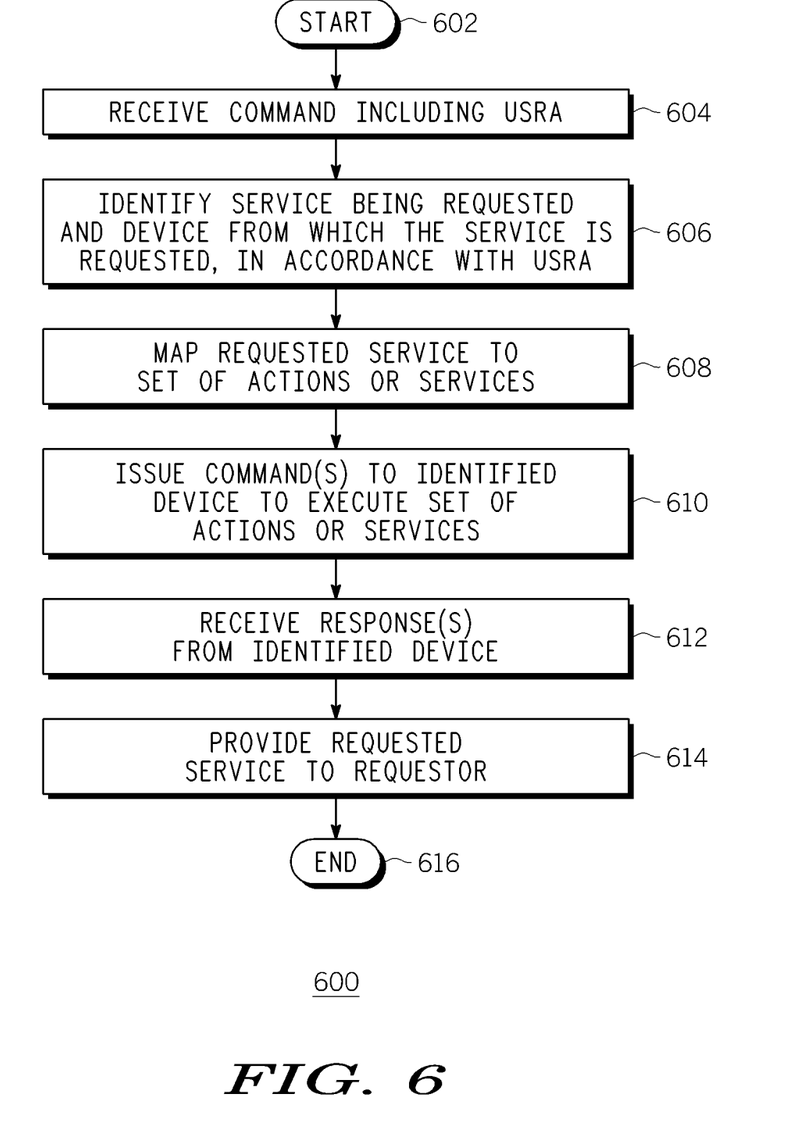
FIG. 6 is a flow diagram illustrating one embodiment of a method for registering, locating and invoking a UPnP service.

In step 408, the software bridge registers, locates and, invokes at least one UPnP service, using the semantics of the SIP-URI. Registering UPnP services (e.g., by making connections between UPnP services and SIP URIs) enables UPnP services to be accessed from an SIP domain using regular SIP ID's (e.g., SIP URIs). Registration also enables locating UPnP services (e.g., by determining where/to which domain to route commands), which in turn enables access to services. Invoking UPnP services involves determining which UPnP service a command is requesting and generating a set of actions to be carried out by the UPnP device hosting the UPnP service to be accessed. One embodiment of a method for registering, locating and invoking a UPnP service is illustrated in FIG. 6. Thus, the SIP-URI is used to register and locate UPnP services, rather than to register and locate users.

For example, in one embodiment, the "To" field of an RFC3261 SIP header is used in a REGISTER method, in order to allow the software bridge to specify a UPnP service that needs to be registered in the SIP domain. In particular, usage of the "To" field is "overloaded" to address or register a service offered by a bridge, by including a USRA referring to the service. Normally, the "To" field in a RFC3261 SIP header is used to address or register users, as described above.

For instance, say a user, John, would like to use his SIP device to stream a song stored in the default shared folder of his UPnP media server (hosted by a PC in John's room, with the UPnP friendly name "JohnPC"). Further assume that the software bridge has a service titled "StreamMusic" that supports this scenario. In this case, the software bridge would execute an SIP REGISTER with the "To" field of the RFC3261 SIP header set as "To: JohnPC.StreamMusic@JohnsHome.net", where "JohnsHome.net is the SIP domain that provides the "StreamMusic" service. The software bridge will recognize the UPnP device "JohnsPC" as a device that is allowed to communicate with SIP-based devices.

Alternatively, suppose John wants to use his SIP device to stream a video clip stored in the default shared folder of his digital video recorder (which has the UPnP friendly name "DVR"). Further assume that the software bridge has a service titled "StreamVideo" that supports this scenario. In this case, the software bridge would execute an SIP REGISTER with the "To" field of the RFC3261 SIP header set as "To: DVR.StreamVideo@JohnsHome.net".

In another embodiment, the "To" field of an RFC3261 SIP header is used in an INVITE method, in order to allow an SIP device to locate a UPnP service. This also allows the software bridge to implement the UPnP service in terms of the UPnP actions. Referring back to the example above, when John actually invokes a service from his SIP device, an SIP INVITE message with the "To" field set as described above is generated (e.g., "To: JohnPC.StreamMusic@JohnsHome.net" or "To: DVR.StreamVideo@JohnsHome.net"). The "To" field is used by the software bridge to determined and invoke the service. The software bridge will recognize the UPnP domain (e.g., "JohnsHome.net") as a place to communicate with SIP devices.

In yet another embodiment, the "To" field of an RFC3261 SIP header is used in an INVITE method message, in order to allow an SIP device to call media items or to receive particular files or services. This also allows system elements of the software bridge to understand the methods to use, determined by the media resource attributes. For example, if a cal extension calendar resource were called, the software bridge would create a rendered image of the calendar, to be streamed to the SIP device. As another example, if a .wav extension resource, the software bridge would stream the music to the SIP device. In this case, the "StreamVideo" portion of the exemplary USRA is used by the software bridge to select streaming video from the UPnP device to be sent to the SIP device.

The method 400 then terminates in step 410.

The method 400 thus relies on the re-use (overloading) of existing RFC3261 SIP and UPnP communication messages and on common applications (e.g., an existing contact book application, an RFC2833-compliant dual-tone multi-frequency (DTMF) application on an SIP communication device or the like) to configure a USRA on a SIP device. No additional protocol features (e.g., SIMPLE), changes to the SIP specification or new application features are needed, making the overloading transparent to software and hardware. Thus, the invention is extensible to legacy SIP and UPnP devices. However, from an end-user perspective, UPnP applications are now accessible using SIP devices. Moreover, by relaying session services offered by an SIP device to a UPnP network, the invention enables a UPnP device to access the session services, thus facilitating bidirectional internetworking.

FIG. 6 is a flow diagram illustrating one embodiment of a method 600 for registering, locating and invoking a UPnP service (e.g., in accordance with step 408 of the method 400).

The method 600 is initialized at step 602 and proceeds to step 604, where the software bridge receives a command including a USRA from a SIP device. For example, the command may be a SIP REGISTER command with the "To" field of the RFC3261 SIP header set as "To: JohnPC.StreamMusic@JohnsHome.net".

In step 606, the software bridge identifies the service being requested by the command (e.g., StreamMusic in the above example) and the UPnP device from which the service is requested (e.g., JohnPC in the above example), in accordance with the USRA. The domain specified in the USRA tells the software bridge where to route the command.

In step 608, the software bridge maps the requested service to a set (i.e., one or more) of actions or services. For instance, in the above example, the StreamMusic service requested by the command might map to a series of actions including: (1) "browse" (e.g., browse the music available at the UPnP device); (2) "select" (e.g., select an item from the available music); and (3) "play" (e.g., play the selected item).

In step 610, the software bridge issues one or more commands (in UPnP format) to the identified UPnP device to execute the set of actions or services. The software bridge then receives a response from the identified UPnP device in step 612. For instance, if the software bridge issued a command to the UPnP device to "browse" in step 610, the UPnP device might respond in step 612 with a list of available music.

In step 614, the software bridge provides the requested service to the requestor/SIP device. For instance, the software bridge might provide the list of songs available from the identified UPnP device, so that the requestor may browse the list and make a selection.

The method 600 terminates in step 616.

Figure 5:
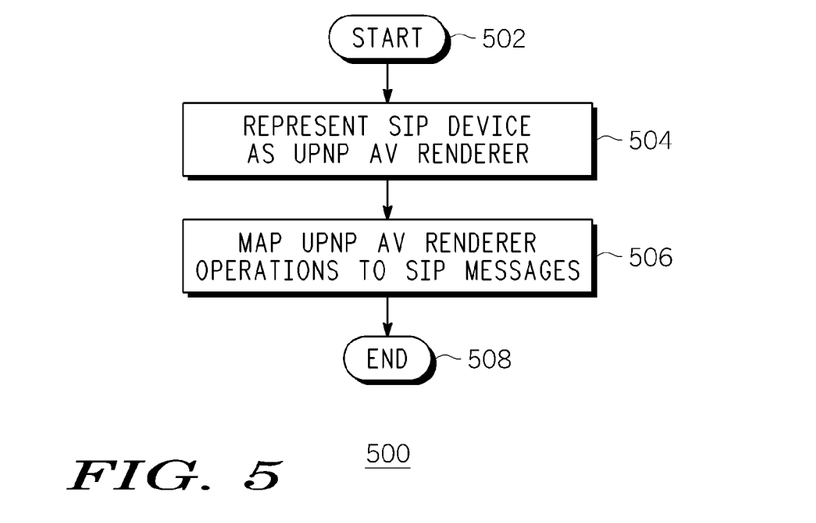
FIG. 5 is a flow diagram illustrating a more detailed embodiment of a method for bridging Session Initiation Protocol and Universal Plug and Play devices.

FIG. 5 is a flow diagram illustrating a more detailed embodiment of a method 500 for bridging Session Initiation Protocol and Universal Plug and Play devices. Like the method 300, the method 500 may be implemented at a software bridge, for example embodied in a residential gateway or at a standalone accessory to an SIP device. The method 500 is specifically directed to enabling a UPnP device to access session-based services offered by an SIP device. Thus, for example, the method 500 may be implemented by a user in order to stream video from a UPnP media server onto an SIP cordless phone, using a UPnP enabled television remote control. Alternatively, the method 500 may be implemented by a user in order to use a SIP device to retrieve content stored on a UPnP media server and stream the retrieved content onto the SIP device.

The method 500 is initialized at step 502 and proceeds to step 504, where the software bridge represents the SIP device to the UPnP network as a "virtual" UPnP audio/visual (AV) renderer device, hosted by the software bridge. That is, the software bridge appears as a UPnP device to the UPnP network. Thus, the "virtual" UPnP renderer is an alias for the SIP device, which represents the SIP device in the UPnP domain (whereas a "real" UPnP device has UPnP software and a UPnP identifier and communicates with the rest of the UPnP network using UPnP protocol). In one embodiment, the software bridge is configured by determining which SIP devices are available to provide services and creating proxies (virtual UPnP devices) for each available SIP device. In accordance with step 502, the "virtual" UPnP renderer advertises its presence on the UPnP network, so that the "virtual" UPnP renderer device is discoverable by legacy UPnP control points. Once the "virtual" UPnP renderer device is discovered, the legacy UPnP control points may involve the "virtual" UPnP renderer device in a session with a legacy UPnP media server.

In step 506, the software bridge maps the UPnP AV renderer operations to SIP messages. For instance, upon discovery by a legacy UPnP control point, the software bridge may map UPnP signaling messages related to session establishment to SIP signaling messages. In further embodiments (e.g., involving UPnP control point initiated sessions), the UPnP AVT Play message is mapped to a SIP INVITE message, such that a SIP/UPnP session manager component of a bridge may take inputs from the "virtual" UPnP renderer in order to perform mapping operations. In another embodiment (e.g., involving a SIP device initiated session), a SIP INVITE message is mapped to a set of UPnP actions (e.g., UPnP CDS Browse, UPnP AVT SetTransport URI, UPnP AVT Play or the like), and the SIP/UPnP session manager component of the software bridge performs the mapping operations. In another embodiment still (e.g., involving a UPnP control point initiated session), a SIP session is initiated once the "virtual" UPnP renderer completes a download of the media session over hypertext transport protocol (HTTP).

In one embodiment, a UPnP Content Directory Service could be used by using a GetProtocolInfo( ) message in order to obtain a protocol/format list for an SIP device. In one embodiment, the "virtual" UPnP renderer has SIP to UPnP protocol mapping functionality. In a further embodiment still, the "virtual" UPnP renderer has media transcoding functionality.

The method 500 terminates in step 508.

The method 500 therefore allows devices that cannot normally interact directly (e.g., UPnP media servers/control points and SIP devices) to interact via a "virtual" UPnP renderer acting on behalf of the SIP device. In further embodiments, the "virtual" UPnP renderer may be placed on the media path. Such placement may support valuable applications, such as the ability to perform real-time transcoding when there is a mismatch in codec abilities between a UPnP media server and a SIP device.

Figure 7:
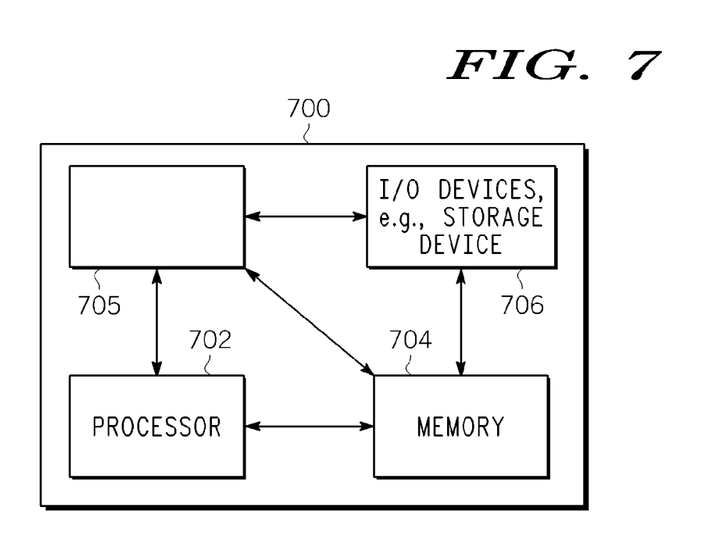
FIG. 7 is a high level block diagram of the present software bridge that is implemented using a general purpose computing device.

FIG. 7 is a high level block diagram of the present software bridge that is implemented using a general purpose computing device 700, such as a personal computer, a set top box, a residential gateway, a mobile telephone, a personal digital assistant or the like. In one embodiment, a general purpose computing device 700 comprises a processor 702, a memory 704, a bridge module 705 and various input/output (I/O) devices 706 such as a display, a keyboard, a mouse, a modem, a network connection and the like. In one embodiment, at least one I/O device is a storage device (e.g., a disk drive, an optical disk drive, a floppy disk drive). It should be understood that the bridge module 705 can be implemented as a physical device or subsystem that is coupled to a processor through a communication channel.

Alternatively, the bridge module 705 can be represented by one or more software applications (or even a combination of software and hardware, e.g., using Application Specific Integrated Circuits (ASIC)), where the software is loaded from a storage medium (e.g., I/O devices 706) and operated by the processor 702 in the memory 704 of the general purpose computing device 700. Additionally, the software may run in a distributed or partitioned fashion on two or more computing devices similar to the general purpose computing device 700.

Thus, in one embodiment, the bridge module 705 for bridging SIP and UPnP devices described herein with reference to the preceding figures can be stored on a computer readable medium or carrier (e.g., RAM, magnetic or optical drive or diskette, and the like).

Thus, the present invention represents a significant advancement in the field of home and mobile networking applications. Embodiments of the invention rely on overloading the features of RFC 3261 SIP and on common applications. No additional protocol features, changes to the SIP specification or new application features are needed. Thus, the invention is extensible to legacy SIP and UPnP devices. Moreover, by relaying session services offered by an SIP device to a UPnP network, the invention enables a UPnP device to access the session services, thus facilitating bidirectional internetworking.

While the foregoing is directed to embodiments of the invention, other and further embodiments of the invention may be devised without departing from the basic scope thereof.

What is claimed is:

1. A method for bridging a session initiation protocol (SIP) device and a universal plug and play (UPnP) device, the method comprising:
   receiving a command from the SIP device to access the UPnP device, wherein the command includes bridging an address format that reuses a format of a SIP URI (Uniform Resource Identifier) to address a service associated with the universal plug and play UPnP device, wherein the address format comprises a SIP domain of the SIP device ("Domain"), a device identifier of the UPnP device ("deviceID"), and a service identifier of the service associated with the UPnP device that is requested by the command ("serviceID"), wherein the address format arranges the Domain, the deviceID, and the serviceID using a syntax that includes each of the deviceID, the serviceID, and the Domain;
   mapping the command to a series of actions to be executed by the UPnP device;
   transmitting one or more UPnP commands corresponding to the series of actions to the UPnP device; and
   receiving a response from the UPnP device based on the one or more UPnP commands.

2. The method of claim 1, further comprising:
   discovering at least one UPnP device, including one or more services associated with the at least one UPnP device; and
   associating a user service request address with each discovered UPnP device and the discovered UPnP device's associated services, wherein each user service request address is an address format that reuses a format of a SIP URI.

3. The method of claim 2, wherein each user service request address reuses a format of a SIP URI.

4. The method of claim 3, further comprising:
   registering at least one UPnP service using semantics of a SIP URI.

5. The method of claim 4, wherein a "To" field of a SIP header is used in a REGISTER method to specify a UPnP service for registration in a SIP domain.

6. The method of claim 4, further comprising:
   locating the at least one UPnP service using the semantics of the SIP URI.

7. The method of claim 6, wherein a "To" field of a SIP header is used in an INVITE method to enable the SIP device to locate the at least one UPnP service.

8. The method of claim 6, further comprising:
   invoking the least one UPnP service using the semantics of the SIP URI.

9. The method of claim 8, wherein a "To" field of a SIP header is used in an INVITE method to enable the SIP device to call at least one media item.

10. The method of claim 1, further comprising:
    representing the SIP device to a UPnP network as a UPnP audio/visual renderer device; and
    mapping at least one operation of the UPnP device to at least one SIP message.

11. The method of claim 10, wherein a UPnP GetProtocolInfo( ) message is used to obtain a protocol/format list of the SIP device.

12. The method of claim 1, wherein the syntax of the address format comprises "deviceID.serviceID@Domain".

13. A non-transitory computer readable medium containing an executable program for bridging a session initiation protocol (SIP) device and a universal plug and play (UPnP) device, where the executable program comprises instructions for:
    receiving a command from the SIP device to access the UPnP device, wherein the command includes an address format that reuses a format of a SIP URI (Uniform Resource Identifier) to address a service associated with the UPnP device, wherein the address format comprises a SIP domain of the SIP device ("Domain"), a device identifier of the UPnP device ("deviceID"), and a service identifier of the service associated with the UPnP device that is requested by the command ("serviceID"), wherein the address format arranges the Domain, the deviceID, and the serviceID using a syntax that includes each of the deviceID, the serviceID, and the Domain;
    mapping the command to a series of actions to be executed by the UPnP device;
    transmitting one or more UPnP commands corresponding to the series of actions to the UPnP device; and
    receiving a response from the UPnP device based on the one or more UPnP commands.

14. The non-transitory computer readable medium of claim 13, wherein the bridging allows the SIP device to access at least one UPnP service.

15. The non-transitory computer readable medium of claim 14, wherein the executable program further comprises instructions for:
    discovering at least one UPnP device, including one or more services associated with the at least one UPnP device; and
    associating a user service request address with each discovered UPnP device and the discovered UPnP device's associated services, wherein each user service request address is an address format that reuses a format of an identifier of a SIP URI.

16. The non-transitory computer readable medium of claim 15, wherein each user service request address reuses a format of a SIP URI.

17. The non-transitory computer readable medium of claim 16, wherein the executable program further comprises instructions for:
    registering at least one UPnP service using semantics of a SIP URI;
    locating the at least one UPnP service using the semantics of the SIP URI; and
    invoking the least one UPnP service using the semantics of the SIP URI.

18. The non-transitory computer readable medium of claim 13, wherein the bridging allows the UPnP device to access at least one session-based service offered by the SIP device.

19. The non-transitory computer readable medium of claim 13, wherein the syntax of the address format comprises "deviceID.serviceID@Domain".

20. A system comprising:
a session initiation protocol (SIP) device; and
a universal plug and play (UPnP) device; and
a computing device executing a software bridge configured to:
receive a command from the SIP device to access the UPnP device, wherein the command includes an address format that reuses a format of a SIP URI (Uniform Resource Identifier) to address a service associated with the UPnP device, wherein the address format comprises a SIP domain of the SIP device ("Domain"), a device identifier of the UPnP device ("deviceID"), and a service identifier of the service associated with the UPnP device that is requested by the command ("serviceID"), wherein the address format arranges the Domain, the deviceID, and the serviceID using a syntax that includes each of the deviceID, the serviceID, and the Domain;
map the command to a series of actions to be executed by the UPnP device;
transmit one or more UPnP commands corresponding to the series of actions to the UPnP device; and
receive a response from the UPnP device based on the one or more UPnP commands.

* * * * *

UNITED STATES PATENT AND TRADEMARK OFFICE
CERTIFICATE OF CORRECTION

PATENT NO. : 8,873,570 B2
APPLICATION NO. : 11/969648
DATED : October 28, 2014
INVENTOR(S) : Sethuramalingam P et al.

It is certified that error appears in the above-identified patent and that said Letters Patent is hereby corrected as shown below:

*In the Claims:*

*Claim 1, column 7, lines 27-28:*

"UPnP device, wherein the command includes bridging an address format that reuses a format of a SIP URI"

should read

"UPnP device, wherein the command includes an address format that reuses a format of a SIP URI"

*Claim 1, column 7, lines 29-30:*

"associated with the universal plug and play UPnP device,"

should read

"associated with the UPnP device,"

Signed and Sealed this
Thirty-first Day of March, 2015

Michelle K. Lee
*Director of the United States Patent and Trademark Office*